United States Patent [19]

Wang et al.

[11] Patent Number: 5,183,792
[45] Date of Patent: Feb. 2, 1993

[54] CATALYST FOR MAKING POLYETHYLENE

[75] Inventors: Li Wang, Bloomingdale, Ill.; Roy T. Mitsche, Peoria, Ariz.

[73] Assignee: Allied-Signal Inc., Morris Township, Morris County, N.J.

[21] Appl. No.: 798,214

[22] Filed: Nov. 26, 1991

[51] Int. Cl.$^5$ .................... B01J 21/06; B01J 21/08; B01J 23/26; B01J 37/03
[52] U.S. Cl. ...................................... 502/242
[58] Field of Search ................... 502/236, 242

[56] References Cited

U.S. PATENT DOCUMENTS

| | | | |
|---|---|---|---|
| 2,657,149 | 10/1953 | Iler | 423/335 X |
| 2,765,242 | 10/1956 | Alexander et al. | 423/338 X |
| 3,862,104 | 1/1975 | Witt | 502/237 X |
| 3,867,306 | 2/1975 | Witt et al. | 502/236 |
| 3,870,656 | 3/1975 | Brown et al. | 502/439 |
| 3,887,494 | 6/1975 | Dietz | 502/236 |
| 3,900,457 | 8/1975 | Witt | 502/237 X |
| 4,081,407 | 3/1978 | Short et al. | 502/237 |
| 4,345,055 | 8/1982 | Hawley | 502/242 X |
| 4,419,268 | 12/1983 | McDaniel | 502/236 X |
| 4,436,882 | 3/1984 | Witt | 502/242 X |
| 4,436,883 | 3/1984 | Witt | 502/242 X |
| 4,547,557 | 10/1985 | McDaniel | 502/236 |

FOREIGN PATENT DOCUMENTS 2068768  8/1981  United Kingdom ................ 502/242

Primary Examiner—W. J. Shine
Assistant Examiner—Douglas J. McGinty
Attorney, Agent, or Firm—Mary Jo Boldingh; Harold N. Wells; Roger H. Criss

[57] ABSTRACT

The instant invention provides an olefin polymerization catalyst comprising chromium and titanium supported on silica. The catalyst is prepared with a low sodium ammonia-stabilized silica sol which has an average silicate particle size of from about 2 to about 6 nm. The catalyst produces polyethylene or a copolymer of ethylene and another olefin selected from the group consisting of the $C_3$ to $C_8$ mono 1-olefins, the polymer having a high melt index and a narrow molecular weight distribution.

15 Claims, No Drawings

CATALYST FOR MAKING POLYETHYLENE

BACKGROUND OF THE INVENTION

(1) Field of the Invention

This invention relates generally to polyolefin production. In particular, this invention relates to a process and a catalyst for making high melt index, low water vapor transmission, film grade, high density homopolymers from ethylene and copolymers from ethylene and another olefin selected from the group consisting of the $C_3$ to $C_8$ mono 1-olefins. The invention concerns a chromium-titanium silica-supported catalyst in which the high porosity silica support is prepared from an ammonia-stabilized silica sol which contains little sodium and which has an average silicate particle size ranging from about 2 to about 6 nm preferably about 5 nm.

(2) Description of the Related Art

It is known that chromium-titanium silica-supported catalysts can be used in polyolefin production. Numerous patents cover processes and catalysts in which the silica support is in the form of a hydrogel and is prepared using sodium silicate ("water glass") or other alkali metal silicates. U.S. Pat. No. 3,862,104 discloses formation of the hydrogel by the addition of an alkali metal silicate to an ammonium salt solution. The resultant gel is subsequently washed to reduce the alkali metal content. In U.S. Pat. Nos. 3,900,457, 3,870,656, and 3,887,494, the hydrogel is instead formed by adding an alkali metal silicate to an acid. After aging, the gel is also washed to reduce the alkali metal content and then is mixed with an oxygen-containing organic compound. Both the organic compound and water are then removed from the gel to form a substantially water-free support, a xerogel. The metals chromium and titanium may be added to the hydrogel either before gel formation (U.S. Pat. Nos. 3,870,656, 3,887,494, 4,436,882, 4,436,883) or after gel formation (U.S. Pat. Nos. 3,862,104, 3,900,457). A discussion of the controlling the rate of addition of silicate to the acid appears in U.S. Pat. Nos. 3,867,306 and 3,900,457.

Another patent, U.S. Pat. No. 4,547,557, discloses the preparation of a silica-titania cogel which does not contain alkali metal and thus does not require a washing step to remove alkali metal ions. The gel is prepared by partially hydrolyzing a silicate ester in an organic solvent and combining the partially hydrolyzed ester with a titanium tetraalkoxide to complete the hydrolysis. Addition of a base completes formation of the gel. A chromium compound may also be added to form a ter-gel, a three-component gel with all three components present in the mixture before gelation. Since an organic solvent rather than an aqueous solvent is utilized, azeotropic distillation with an organic liquid to remove water from the gel is not necessary.

The use of azeotropic distillation to remove water from the gel network without destroying the pore structure in the process is also known. See, e.g., U.S. Pat. Nos. 2,765,242, 3,862,104 and 4,081,407. A method of protecting the gel from sintering during the drying step is called surface esterification. The gel is refluxed in an alcohol to effect the reaction between the alcohol and the surface silanol groups on the gel. This method was first taught in U.S. Pat. No. 2,657,149 and first applied as a protection of silica gel in U.S. Pat. No. 2,765,242.

SUMMARY OF THE INVENTION

The instant invention provides an olefin polymerization catalyst comprising chromium and titanium supported on silica. The source of silica is an ammonia-stabilized silica sol with an average silicate particle size of from about 2 to about 6 nm (a surface area of about 475 to about 1430 $m^2/g$) preferably about 5 nm. In the preferred embodiment, the catalyst is prepared by making an aqueous solution containing water soluble chromium and titanium compounds which will not be hydrolyzed and precipitated prior to the gelling step, adding the ammonia-stabilized silica sol to the aqueous solution, adding a sufficient amount of ammonium hydroxide to form a hydrogel, aging, washing, and drying the hydrogel, and removing water from the pores of said hydrogel to form the catalyst.

The invention also teaches a process for preparing the polymerization catalyst and an olefin polymerization process using the catalyst comprising activating the catalyst in air to convert $Cr^{3+}$ to $Cr^{6+}$ and bind it to the $SiO_2$ gel, at a temperature in the range of from about 650° C. to about 875° C. for more than one hour, preferably from about 2 to about 8 hours, charging a reactor with said catalyst, charging the reactor with an alkane chosen from the group consisting of the $C_4$ to $C_6$ alkanes, raising the reactor temperature to about 100° C. to about 115° C., charging the reactor with ethylene and, optionally, a $C_3$ to $C_8$ mono 1-olefin increasing the pressure of the reactor to a gage pressure in the range of from about 3.1 to about 4.5 MPa, and recovering said polyolefin.

The ammonia-stabilized silica sol contains little sodium (less than about 0.015 wt %). The average silicate particle size should be from about 2 to about 6 nm preferably about 5 nm. A larger average silicate particle size will result in a catalyst with a low catalyst surface area and, consequently, a catalyst with inadequate polymerization activity. Use of silica sol will eliminate the need for a sodium washing step during the catalyst preparation. The resultant catalyst produces a polymer with a higher melt index than the polymer produced by the catalyst prepared using sodium silicate, while maintaining the narrow molecular weight distribution of the polymer.

DESCRIPTION OF THE PREFERRED EMBODIMENT(S)

This invention relates generally to the production of polyolefins, and in particular to a process and a catalyst for making high density, film grade homopolymers from ethylene and copolymers from ethylene and another olefin selected from the group consisting of the $C_3$ to $C_8$ mono 1-olefins, which have high melt indices, low water vapor transmission, and narrow molecular weight distributions. The instant invention addresses the problem of providing a catalyst for the production of polyolefins with these properties and of providing a simpler and more economical polymerization catalyst preparation process, eliminating the need for repeated washing to remove sodium and wastewater treatment by using as the source of silica an ammonia-stabilized silica sol with an average silicate particle size ranging from about 2 to about 6 nm preferably about 5 nm.

It is contemplated that chromium-titanium-silica catalysts may be prepared by a number of methods, in the preferred embodiment, the catalysts are prepared by adding the ammonia-stabilized silica sol to an aqueous solution containing chromium (III) and titanium (IV) salts and a sufficient amount of ammonium hydroxide is then added to form a hydrogel. The hydrogel is aged, washed, and dried. To avoid destroying the pore structure, the drying step is carried out by removing water from the pores by freeze drying, by washing the hydrogel with a water miscible organic solvent, or by azeotropic distillation using a partially water miscible organic compound. After drying, the hydrogel may be refluxed in an alcohol to effect esterification of the surface silanol groups on the gel.

The water soluble chromium and titanium salts used to prepare the aqueous solution may include Cr(III) compounds such as $CrCl_3 \cdot 6H_2O$, $Cr(NO_3)_3 \cdot 9H_2O$, and $(CH_3COO)_7Cr_3(OH)_2$, and any titanium compound which is soluble in water and which will not be hydrolyzed and precipitated, e.g., titanium oxychloride, titanium sulfate, titanium oxalate. The titanium salt $TiCl_4$ may be used provided that additional acid is added to the solution to prevent it from hydrolyzing and precipitating prior to the gelling step. The concentrations of chromium and titanium in the aqueous solution should be adjusted so that the final dried catalysts contain 0.1 to 2.0 wt % chromium, preferably, about 0.5 to about 1.5 wt %, and 0.1 to 5 wt % titanium, preferably about 1.5 to about 4.0 wt %. After the addition of the ammonia-stabilized silica sol, the silica concentration in the chromium-titanium aqueous solution should be in the range of from about 2 to about 16 wt %.

In preparing the catalysts of the instant invention, the silica sol is added to the chromium-titanium solution at room temperature with rapid mixing. It is critical that the silica sol be added to the chromium-titanium solution rather than the chromium-titanium solution added to the silica sol as the latter method will cause gelation upon contact and will result in an inhomogeneous gel. The rate of silica sol addition is not critical, however, as it is in the preparation of a catalyst using sodium silicate (water glass) where the rate of addition must be carefully controlled to prevent localized gelation.

After silica sol is added to the chromium-titanium aqueous solution, a dilute solution (1-10%) of ammonium hydroxide is gradually added to the mixture with rapid stirring to effect the gelation and form the hydrogel. The gel pH is adjusted to about 7-10, preferably about 8-9 and the hydrogel is then aged at temperatures between from about 70° C. to about 100° C., preferably about 80° C. to about 90° C., for a period of from about 4 to about 30 hours, preferably between about 10 to about 20 hours. The cured hydrogel is allowed to cool to room temperature and filtered. The filter cake is then washed with equal weight of water once to remove ammonium chloride and the small amount of sodium present in the silica sol precursor.

By contrast, a catalyst prepared using sodium silicate typically contains about 9-14% wt % sodium and must be repeatedly washed with ammonium chloride or ammonium nitrate salt water to remove the sodium—a time-consuming and costly procedure.

The preferred method of drying the washed hydrogel is azeotropic distillation, but other methods such as freeze drying or direct wash with miscible organic solvents are feasible. When the preferred method is used, the hydrogel is mixed with a normally liquid, partially water miscible, low surface tension organic compound and the water removed by azeotropic distillation. The organic compound is then vaporized to recover the dried and powder-like xerogel, the catalyst. Suitable organic compounds include ethyl acetate, butylaldehyde, methyl isobutyl ketone, n-propyl alcohol, butyl alcohols, pentyl alcohols and hexyl alcohols.

The resultant catalysts are used for making polyethylene and copolymers of polyethylene and another olefin selected from the group consisting of the $C_3$ to $C_8$ mono 1-olefins. The catalysts can be employed in any of the polymerization processes, e.g., gas phase, solution, particle form. The catalyst is first activated in air at a temperature in the range of from about 650° C. to about 875° C., and preferably in the range of from about 700° C. to about 760° C. These activation temperatures as well as the temperatures at which the catalyst is used in the production of polymer are specifically tailored to produce high melt index, low water vapor transmission, film grade, high density polymers.

An appropriate amount of the activated catalyst is then transferred to an autoclave reactor without exposing it to the environment, in particular to avoid contamination, e.g., from carbon dioxide, carbon monoxide, water, and sulfur-containing compounds. A low molecular weight alkane is then charged into the reactor as the reaction medium. This alkane is chosen from the $C_4$ to $C_6$ alkanes, preferably isobutane. In order to carry out the reaction, the reactor temperature is then raised to a temperature in the range of from about 100° C. to about 115° C., preferably in the range of from about 105° C. to about 110° C. Ethylene and, optionally, a $C_3$ to $C_8$ mono 1-olefin, e.g., 1-hexene, is charged into the reactor and the pressure of the reactor increased to a gage pressure of about 3.1 to about 4.5 MPa, preferably 3.5 to about 3.8 MPa. The olefin(s) are fed to the reactor on demand as the polymerization reaction begins. The reaction is terminated after the desired mass of polymer per gram of catalyst is reached. The product will have a high melt index (MI) and a low high load melt index/melt index ratio (HLMI/MI) and, as is observed when these two properties are high and low respectively, a low water vapor transmission. Also, because of its high melt index, the polymer will have better processibility and high environmental stress crack resistance when finished to a film.

EXAMPLE 1

Inventive Catalyst Preparation

Inventive Catalysts A and B were prepared as follows:

Catalyst A—A stock solution of 2.5 wt % chromium was made by dissolving $CrCl_3 \cdot 6H_2O$ in water. A Cr-Ti aqueous solution was then prepared by adding 20 g of the 2.5% chromium stock solution and 22 g of a titanium oxychloride solution (12.6 wt % Ti and 18 wt % free HCl) to 128 g $H_2O$ in a 2-liter beaker. To this Cr-Ti solution, 571 g of Nalco 2326 ammonia stabilized silica sol containing 17.5 wt % of silicate was added. A hydrogel was then formed by adding 400 g of ammonium hydroxide solution (1.1 wt % $NH_3$) to the mixture over a period of 15 minutes. The final gel pH was 8.6. The hydrogel was then covered and aged at 90° C. for 18 hours. The aged hydrogel was allowed to cool down to room temperature and was then filtered. The filter cake was washed once with equal weight of water and filtered again to substantially remove ammonium chloride. The washed filter cake was mixed with about 1.5 times by weight of 1-pentanol, and the trapped water was removed by azeotropic distillation. After the water was completely removed, the gel was refluxed in 1-pentanol for 1 hour. The remaining 1-pentanol was then vaporized. The dried powder-like catalyst was collected. The resultant catalyst contained 0.5 wt % Cr and 2.8 wt % of Ti and 206 ppm sodium.

Catalyst B—This catalyst was prepared by the same procedure as was Catalyst A except that the chromium in the Cr-Ti aqueous solution was doubled. The final catalyst contained 1.0 wt % of Cr and 2.8 wt % Ti and 260 ppm sodium.

EXAMPLE 2

Comparative Catalysts

Catalyst C-1—This comparative catalyst was prepared using sodium silicate. An aqueous Cr-Ti solution was prepared by adding 3.9 g $Cr(NO_3)_3.9HO$ and 24.5 g of titanyl sulfate solution containing 5.6% by weight of Ti to 140 g $H_2O$ in a 2-liter beaker. To this Cr-Ti solution, 12.9 g of concentrated sulfuric acid (96%). The acid was added in order to prevent premature gelation upon addition of the sodium silicate and also to reach the desired gel pH level after complete addition of the sodium silicate. Over a 30 minute period, 324 g of diluted sodium silicate (prepared by diluting 162 g of sodium silicate (30.8 wt % $SiO_2$, 9 wt % $Na_2O$) with an equal weight of water) was added to the acidic Cr-Ti solution and the mixture gelled. The gel pH was 6.8. The hydrogel was then aged at 90° C. for 4 hours, filtered, washed eight times with 500 mL of a 1 wt % $NH_4NO_3$ solution and once with 500 mL deionized water to bring the sodium level down to 268 ppm. The washed hydrogel was then dried by azeotropic distillation with 1-pentanol.

By comparison, catalysts prepared with ammonia stabilized silica sol may be cured for a much longer period of time (e.g., 18 hours instead of 4 hours). Such a prolonged curing time would cause collapsing of the gel structure of catalysts prepared using sodium silicate and would typically yield a catalyst with a pore volume of less than 1.5 mL/g.

Catalyst (C-2)—This comparative catalyst is a commercial tergel catalyst, Davison 963, used for making high melt index high density polyethylene. The exact preparation procedure is not known.

EXAMPLE 3

Catalyst Characterization

The porosity of the inventive and comparative catalysts prepared in Examples 1 and 2 was determined by the nitrogen adsorption BET method. The catalysts were calcined in air at 704° C. prior to the analysis. Their properties are shown in Table I below:

TABLE I

| Sample | Pore Volume mL/g | Pore Diameter Å | Surface Area $m^2/g$ |
|---|---|---|---|
| A | 1.81 | 231 | 313 |
| B | 2.10 | 260 | 322 |
| C-1 | 2.65 | 176 | 600 |
| C-2 | 2.08 | 178 | 470 |

Table I clearly shows that the catalysts made from ammonia stabilized sol, inventive catalysts A and B, have higher pore diameters than the comparative catalysts, C-1 and C-2. Catalysts with higher pore diameters will generally produce polyethylene with higher melt indices.

EXAMPLE 4

Catalyst Performance

The inventive and comparative catalysts prepared in Examples 1 and 2 were used to produce polyethylene. The catalysts were first activated in air at about 704° C. About 80 mg of the activated catalyst was transferred to an autoclave reactor without further exposing it to the environment, e.g., to carbon dioxide, carbon monoxide, water, and sulfur-containing compounds. The reactor was then charged with isobutane and the reactor temperature raised to 108° C. Ethylene was then charged into the reactor and the pressure increased to a gage pressure of 3.79 MPa. The ethylene was then fed to the reactor on demand as the polymerization reaction began. The reaction was terminated after 4000 g of polyethylene per gram of catalyst was produced.

The polyethylene produced was then characterized by determining the regular melt index (MI) by ASTM procedure D 1238-65T condition E and the high load melt index (HLMI) by ASTM procedure D 1238-65T condition F. All melt indices were adjusted to 4000 g/g productivity i.e., in order to compare melt indices, the melt index for the polyethylene produced by each catalyst for exactly 4000 g polyethylene/g catalyst is determined by extrapolation. Results appear in Table II.

The inventive catalysts A and B prepared from silica sol produced polyethylene with a higher melt index than did the catalysts prepared with sodium silicate because of the larger pore diameter of the inventive catalysts. However, the molecular weight distribution of the polyethylene produced using the inventive catalysts remains low as indicated by the low HLMI/MI ratio. The inventive catalysts produced polyethylene with densities comparable to the catalysts prepared with sodium silicate.

TABLE II

| Sample | Silica | Pore Diameter | Melt* Index | HLMI/MI Ratio | Density g/mL |
|---|---|---|---|---|---|
| A | silica sol | 231 | 2.00 | 41 | 0.9603 |
| B | silica sol | 260 | 1.23 | 42 | 0.9600 |
| C-1 | Na silicate | 176 | 0.93 | 42 | 0.9591 |
| C-2 | Na silicate | 178 | 0.86 | 44 | 0.9596 |

*Adjusted to 4000 g polyethylene/g catalyst productivity.

We claim:

1. An olefin polymerization catalyst comprising chromium and titanium supported on silica prepared by the process comprising the steps of:
    a) preparing an aqueous solution containing water soluble chromium and titanium compounds;
    b) adding an ammonia-stabilized silica sol with an average silicate particle size of from about 2 to about 6 nm to solution of (a);
    c) adding a sufficient amount of ammonium hydroxide to the solution of (b) to form a hydrogel;
    d) aging, washing, and drying said hydrogel; and,
    e) removing water from the pores of said hydrogel to form said catalyst.

2. The catalyst of claim 1 wherein the chromium compound is $Cr(NO_3)_3.9H_2O$ and the titanium compound is titanium oxychloride.

3. The catalyst of claim 1 wherein the catalyst contains about 0.1 to about 2.0 wt % chromium and about 0.1 to about 5.0 wt % titanium.

4. The catalyst of claim 1 wherein the average silicate particle size is about 5 nm.

5. The catalyst of claim 1 wherein the hydrogel is aged at a pH between about 7 and about 10.

6. The catalyst of claim 1 wherein the hydrogel is aged at a temperature between about 70° C. and about 100° C.

7. The catalyst of claim 1 wherein the hydrogel is aged for a period of between about 4 and about 30 hours.

8. The catalyst of claim 1 wherein the hydrogel is dried by azeotropic distillation.

9. A process for preparing a polymerization catalyst comprising the steps of:
   a) preparing an aqueous solution containing water soluble chromium and titanium compounds;
   b) adding an ammonia-stabilized silica sol with an average silicate particle size of from about 2 to about 6 nm to said solution;
   c) adding a sufficient amount of ammonium hydroxide to form a hydrogel;
   d) aging, washing, and drying said hydrogel; and,
   e) removing water from the pores of said hydrogel to form said catalyst.

10. The process of claim 9 wherein the chromium compound is $Cr(NO_3)_3 \cdot 9H_2O$ and the titanium compound is titanium oxychloride.

11. The process of claim 9 wherein the catalyst contains about 0.1 to about 2.0 wt % chromium and about 0.1 to about 5.0 wt % titanium.

12. The process of claim 9 wherein the average silicate particle size is about 5 nm.

13. An olefin polymerization catalyst comprising chromium, titanium, and silica wherein the improvement comprises preparing the catalyst with an ammonia-stabilized silica sol having an average silicate particle size ranging from about 2 to about 6 nm.

14. An activated olefin polymerization catalyst prepared by activating the catalyst of claim 13 in air at a temperature in the range of from about 650° C. to about 875° C.

15. An activated polymerization catalyst prepared by activating the catalyst of claim 1 in air at a temperature in the range of from about 650° C. to about 875° C.

* * * * *